US008886620B1

(12) United States Patent
Mukerji

(10) Patent No.: US 8,886,620 B1
(45) Date of Patent: Nov. 11, 2014

(54) ENABLING ORDERED PAGE FLOW BROWSING USING HTTP COOKIES

(75) Inventor: Arindum Mukerji, Seattle, WA (US)

(73) Assignee: F5 Networks, Inc., Seattle, WA (US)

( * ) Notice: Subject to any disclaimer, the term of this patent is extended or adjusted under 35 U.S.C. 154(b) by 938 days.

(21) Appl. No.: 11/243,872

(22) Filed: Oct. 5, 2005

Related U.S. Application Data

(60) Provisional application No. 60/709,049, filed on Aug. 16, 2005.

(51) Int. Cl.
*G06F 7/00* (2006.01)

(52) U.S. Cl.
USPC .......................................................... 707/705

(58) Field of Classification Search
CPC .............. G06F 17/30; G06F 17/30241; G06F 17/30864
USPC ............ 707/1, 4, 10, 100; 709/223, 224, 229, 709/201, 203, 225
See application file for complete search history.

(56) References Cited

U.S. PATENT DOCUMENTS

| | | | | |
|---|---|---|---|---|
| 6,374,359 | B1 * | 4/2002 | Shrader et al. | 726/5 |
| 6,502,102 | B1 * | 12/2002 | Haswell et al. | 1/1 |
| 6,584,505 | B1 * | 6/2003 | Howard et al. | 709/225 |
| 6,871,284 | B2 * | 3/2005 | Cooper et al. | 726/1 |
| 7,080,158 | B1 * | 7/2006 | Squire | 709/245 |
| 7,133,918 | B2 * | 11/2006 | Lai | 709/225 |
| 7,240,100 | B1 * | 7/2007 | Wein et al. | 709/214 |
| 7,739,683 | B2 * | 6/2010 | Mitomo et al. | 717/174 |
| 7,788,407 | B1 * | 8/2010 | Venkat et al. | 709/245 |
| 2001/0016875 | A1 * | 8/2001 | Schwartz et al. | 709/206 |
| 2002/0078192 | A1 * | 6/2002 | Kopsell et al. | 709/223 |
| 2002/0083068 | A1 * | 6/2002 | Quass et al. | 707/100 |
| 2002/0133606 | A1 * | 9/2002 | Mitomo et al. | 709/229 |
| 2002/0140988 | A1 * | 10/2002 | Cheatle et al. | 358/402 |
| 2002/0147772 | A1 * | 10/2002 | Glommen et al. | 709/203 |
| 2002/0161904 | A1 * | 10/2002 | Tredoux et al. | 709/229 |
| 2003/0004746 | A1 * | 1/2003 | Kheirolomoom et al. | 705/1 |
| 2003/0041050 | A1 * | 2/2003 | Smith et al. | 707/1 |
| 2003/0074455 | A1 * | 4/2003 | Banning et al. | 709/229 |
| 2003/0154239 | A1 * | 8/2003 | Davis et al. | 709/201 |

(Continued)

OTHER PUBLICATIONS

Gourley et al., HTTP: The Definitive Guide, 2002, O'Reilly, pp. 257-275.*

(Continued)

*Primary Examiner* — Rehana Perveen
*Assistant Examiner* — Huen Wong
(74) *Attorney, Agent, or Firm* — John W. Branch; Lowe Graham Jones PLLC

(57) ABSTRACT

A system, apparatus, and method are directed to managing an ordered page flow browsing of a website. As a request is received for a webpage on the website, a referrer is examined. If the referrer indicates that the request is from another website, the request may be redirected to a pre-selected webpage on the website. In addition, a cookie may be generated that includes, in part, the request and a secret. The request and rotating secret may also be encrypted. The cookie may then be provided along with a response to the request. When another request is received with the cookie, the cookie may be compared, in part, with the referrer and the secret to determine if the request is from an ordered page within the website. If it is not, the request may be redirected to the pre-selected webpage, thereby enforcing orderly page flow browsing.

23 Claims, 4 Drawing Sheets

(56) References Cited

U.S. PATENT DOCUMENTS

| | | | |
|---|---|---|---|
| 2003/0217332 A1* | 11/2003 | Smith et al. | 715/513 |
| 2004/0010607 A1* | 1/2004 | Lee et al. | 709/229 |
| 2004/0017395 A1* | 1/2004 | Cook | 345/745 |
| 2004/0221006 A1* | 11/2004 | Gopalan et al. | 709/203 |
| 2005/0240863 A1* | 10/2005 | Olander et al. | 715/513 |
| 2005/0262092 A1* | 11/2005 | Beartusk et al. | 707/10 |
| 2005/0268100 A1* | 12/2005 | Gasparini et al. | 713/170 |
| 2006/0022048 A1* | 2/2006 | Johnson | 235/462.1 |
| 2006/0031234 A1* | 2/2006 | Beartusk et al. | 707/100 |
| 2006/0112174 A1* | 5/2006 | L'Heureux et al. | 709/223 |

OTHER PUBLICATIONS

BEA Systems, Inc., BEA WebLogic Workshop Help Ver. 8.1 SP2, Nov. 2003, BEA Systems, Inc., Tutorial Section.*

BEA Systems, Inc., BEA WebLogic Workshop Help Ver. 8.1 SP4, Dec. 2004, BEA Systems, Inc., Developing Web Applications Section.*

Engelschall, Apache HTTP Server Version 2.0 URL Rewriting Guide, Dec. 1997, Apache.org, pp. 1-23.*

Dew, Java Page Flow by Dew, Jan. 29, 2004, BEA Systems, Inc., pp. 1-15.*

Chiu et al., "Integrating Legacy Sites into Web Services with WebXcript", Mar. 2005, International Journal of Cooperative Information Systems.*

Forristal, Jeff, "AppShield Inspects and Protects Your Web Apps From HTTP to Z", Network Computing Website, 3 pages, Apr. 15, 2002. http://www.networkcomputing.com/1308/1308sp1.html.

Dyck, Timothy, "Web Application Security Lockdown", Review: AppShield 4.0 Section, eweek website, 6 pages, May 26, 2003. http://www.eweek.com/article2/0,3959,1110427,00.asp.

Babcock, Charles, "Compuware Automates More Java Development", Developer Pipeline Website, 2 pages, Jan. 31, 2005. http://www.developerpipeline.com/tools/59200243.

Netscape, "Persistent Client State Http Cookies", Netscape website, 5 pages, 1999. http://wp.netscape.com/newsref/std/cookie_spec.html.

Fielding, R. et al., "Hypertext Transfer Protocol—HTTP/1.1", RFC 2616, 165 pages, Jun. 1999.

Kristol and Montulli, "HTTP State Management Mechanism", RFC 2109, 20 pages, Feb. 1997.

Berners-Lee, T. et al., "Hypertext Transfer Protocol—HTTP/1.0", RFC 1945, 57 pages), May 1996.

F5 Networks, Inc., "TrafficShield Security Policy User Manual version 3.2", MAN-0140-00, Chapters 1-4, 81 pages, 2002-2005.

Reardon, Marguerite, "A Smarter Session Switch: Arrowpoint's CS Session Switches Boast The Brains Needed for E-Commerce," Data Communications, Jan. 1999, title page, pp. 3, 5, 18.

Hewitt, John R. et al., "Securities Practice and Electronic Technology," Corporate Securities Series (New York: Law Journal Seminars-Press) 1998, title page, bibliography page, pp. 4.29-4.30.

* cited by examiner

1

ENABLING ORDERED PAGE FLOW BROWSING USING HTTP COOKIES

CROSS-REFERENCE TO RELATED APPLICATIONS

This application claims the benefit of U.S. Provisional Application Ser. No. 60/709,049 entitled "Enabling Ordered Page Flow Browsing Using Secure HTTP Cookies," filed on Aug. 16, 2005, the benefit of the earlier filing date of which is hereby claimed under 35 U.S.C. §119 (e) and which is further incorporated herein by reference.

FIELD OF THE INVENTION

The present invention relates generally to network communications, and more particularly, but not exclusively, to a system and method for managing an ordered page flow browsing of a website.

BACKGROUND OF THE INVENTION

According to some studies, the volume of information available over a network, such as the Internet, is expected to more than triple over the next three years. Data and content is likely to remain the largest percentage of Internet traffic, with the majority of this information being dynamic. Thus, the Internet is rapidly becoming, if it is not already, a major source of information worldwide, sometimes even being called the largest library in the world.

Because of its rapid expansion, there is a desire to present website information in an organized manner that enables rapid and smooth access to its information by a user. Moreover, organizing a website may enable a website owner to present forms, advertisements, information, and so forth, to the user in an order that the website owner might believe is more useful, or effective. For example, it may make more sense for the user to be first presented with a listing of possible items for purchase prior to being presented with a form for ordering items.

However, users have the ability to jump around within websites, and even between websites. In addition, some owners of websites provide deep-level links or cross-links to other websites that may result in circumventing a desired flow of browsing of the other website. Such browsing or linking into websites tends to diminish the effectiveness of organized websites. Therefore, there is a desire in the industry to be able to enforce orderly page flow browsing of a website. Thus, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION OF THE INVENTION

Figure 1:
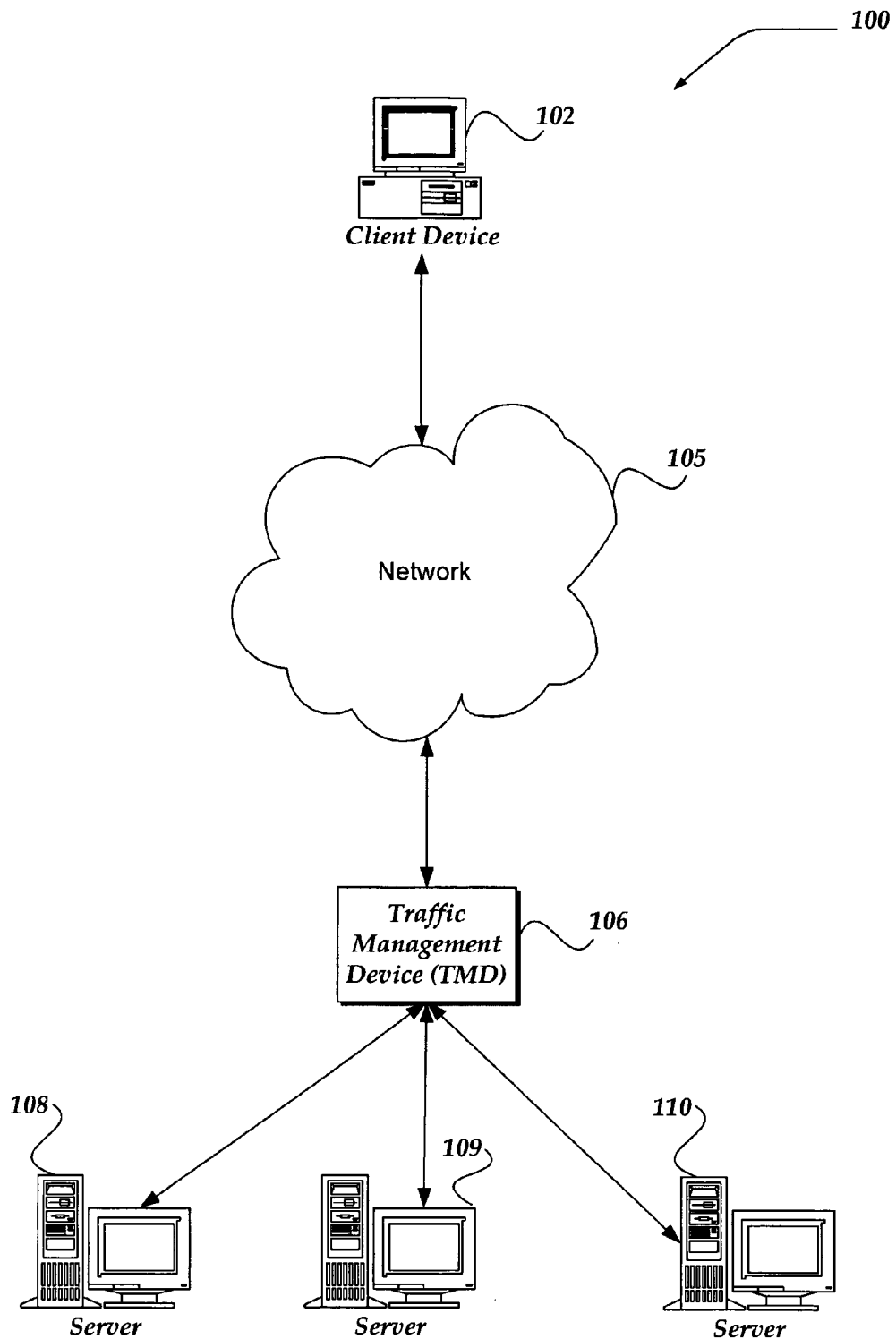
FIG. 1 shows a functional block diagram illustrating one embodiment of an environment for practicing the invention.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

Briefly stated, the present invention is directed towards a system, method, and apparatus for managing ordered page flow browsing of a website. As a request is received for a webpage on the website, a referrer is examined. It is noted that 'referrer' is sometimes misspelled as 'referer.' References herein, however, employ a corrected spelling. As used herein, the term 'referrer' refers to an HTTP referrer field as described in Request for Comments (RFC) 2616 (available at http://www.ietf.org/rfc/rfc2616.txt?number=2616), which is hereby incorporated by reference.

In one embodiment, the request may be received by a traffic management device, or other intermediate device. In one embodiment, the request may use HTTP, with the referrer possibly including location information about from where the request may have linked, such as another website, webpage, or the like. In one embodiment, the location information is a Universal Resource Identifier (URI), such as a Universal Resource Locator (URL), or the like.

If the location information in the referrer indicates that the request is from another website, the request may be redirected to a pre-selected webpage on the website. In one embodiment, the pre-selected webpage is the website's HOME page (or domain name address). However, it may also be to some other webpage. In addition, if the request is to a webpage that includes links to other webpages, a cookie may be generated that includes, in part, the request and a secret. The request and rotating secret may also be encrypted. In one embodiment, the secret is a rotating secret that may be changed based on some event. Moreover, the encrypted cookie may also include information about the source of the request. For example, in one embodiment, the encrypted cookie may include an Internet Protocol (IP) address of the source, or the like.

HTTP cookies are described in RFC 2109, available at http://www.w3.org/Protocols/rfc2109/rfc2109. A slightly different description is provided at http://wp.netscape.com/newsref/std/cookie_spec.html. As used herein, the term "cookie" refers to information that gets passed from a server or traffic manager to a client, and passed back by the client and substantially conforms to the descriptions of cookies in the above documents. Such information may be passed in both directions in an HTTP header. A cookie generally includes a name-value pair, and the term cookie may refer to the value, the name, or the combination of both, or a part of the combination. As used herein, a server may send the client a cookie, and the client may return the cookie it received, and both the sent and returned information is considered to be the same cookie.

The cookie may then be provided along with a response to the request. When another request is received with the cookie, the cookie may be compared, in part, with the referrer and the secret to determine if the request is from an ordered page within the website. That is, is the request following an orderly page flow for browsing the website? In one embodiment, information about the source of the request may also be used in the comparison. If there is not a match, the request may be redirected to the pre-selected webpage, thereby enforcing orderly page flow browsing. Moreover, by employing cookies and referrers, enforcing orderly page flow browsing may be achieved without having to maintain potentially burdensome state information, such as a client's browsing history data, or the like.

Illustrative Operating Environment

FIG. 1 illustrates one embodiment of an environment in which the invention may operate. However, not all of these components may be required to practice the invention, and variations in the arrangement and type of the components may be made without departing from the spirit or scope of the invention.

As shown in the figure, system 100 includes client device 102, network 105, traffic management device (TMD) 106, and servers 108-110. Client device 102 is in communication with TMD 106 through network 105. TMD 106 is in further communication with servers 108-110. Although not shown, TMD 106 may be in communication with servers 108-110 through a network infrastructure that is similar to network 105. For example, in one embodiment, TMD 106, and servers 108-110 might reside within a common local area network type of infrastructure, although the invention is not constrained to such a configuration.

Generally, client device 102 may include virtually any computing device capable of connecting to another computing device and receiving information. Such devices may also include portable devices such as, cellular telephones, smart phones, display pagers, radio frequency (RF) devices, infrared (IR) devices, Personal Digital Assistants (PDAs), handheld computers, wearable computers, tablet computers, integrated devices combining one or more of the preceding devices, and the like. Client device 102 may also include other computing devices, such as personal computers, multiprocessor systems, microprocessor-based or programmable consumer electronics, network devices, and the like. As such, client device 102 may range widely in terms of capabilities and features. For example, a client device configured as a cell phone may have a numeric keypad and a few lines of monochrome LCD display on which only text may be displayed.

In another example, a web-enabled client device may have a touch sensitive screen, a stylus, and several lines of color LCD display in which both text and graphics may be displayed. Moreover, the web-enabled client device may include a browser application enabled to receive and to send wireless application protocol messages (WAP), and/or wired application messages, and the like. In one embodiment, the browser application is enabled to employ HyperText Markup Language (HTML), Dynamic HTML, Handheld Device Markup Language (HDML), Wireless Markup Language (WML), WMLScript, JavaScript, EXtensible HTML (xHTML), Compact HTML (CHTML), and the like, to display and send a message.

Client device 102 also may include at least one client application that is configured to receive content from another computing device. The client application may include a capability to provide and receive textual content, graphical content, audio content, alerts, messages, and the like. Moreover, client device 102 may be further configured to communicate a message, such as through a Short Message Service (SMS), Multimedia Message Service (MMS), instant messaging (IM), interne relay chat (IRC), mIRC, Jabber, and the like, between another computing device, and the like.

In one embodiment, client device 102 may be configured such that an end-user may operate the computing device to make requests for data and/or services from other computers on the network. In one embodiment, client device 102 may employ a network interface unit (sometimes called a transceiver), such as described below, to communicate information with another computing device. Often, the requested data resides in computing devices such as servers 108-110. In this specification, the term "client" refers to a computer's general role as a requester of data or services, and the term "server" refers to a computer's role as a provider of data or services. In general, it is possible that a computer can act as a client, requesting data or services in one transaction and act as a server, providing data or services in another transaction, thus changing its role from client to server or vice versa. In one embodiment, client device 102 is a computing device that is not operated by an end-user.

Network 105 is configured to couple one computing device with another computing device. Network 105 may be enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link.

Network 105 may further include any of a variety of wireless sub-networks that may further overlay stand-alone ad-hoc networks, and the like, to provide an infrastructure-oriented connection. Such sub-networks may include mesh networks, Wireless LAN (WLAN) networks, cellular networks, and the like. Network 105 may also include an autonomous system of terminals, gateways, routers, and the like connected by wireless radio links, and the like. These connectors may be configured to move freely and randomly and organize themselves arbitrarily, such that the topology of network 105 may change rapidly.

Network 105 may further employ a plurality of access technologies including 2nd (2G), 2.5, 3rd (3G), 4th (4G) generation radio access for cellular systems, WLAN, Wireless Router (WR) mesh, and the like. Access technologies such as 2G, 3G, and future access networks may enable wide area coverage for mobile devices with various degrees of mobility. For example, network 105 may enable a radio connection through a radio network access such as Global System for Mobile communication (GSM), General Packet Radio Services (GPRS), Enhanced Data GSM Environment (EDGE), Wideband Code Division Multiple Access (WCDMA), CDMA2000, and the like. In essence, network 105 may include virtually any wired and/or wireless communication mechanisms by which information may travel between one computing device and another computing device, network, and the like.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

TMD 106 may include virtually any device that manages network traffic. Such devices include, for example, routers, proxies, firewalls, load balancers, cache devices, devices that perform network address translation, any combination of the preceding devices, and the like. TMD 106 may, for example, control the flow of data packets delivered to and forwarded from an array of servers, such as servers 108-110. TMD 106 may direct a request for a resource to a particular server based on network traffic, network topology, capacity of a server, content requested, and a host of other traffic distribution mechanisms. TMD 106 may receive data packets from and transmit data packets to the Internet, an intranet, or a local area network accessible through another network. TMD 106 may recognize packets that are part of the same communication, flow, and/or stream and may perform special processing on such packets, such as directing them to the same server so that state information is maintained. TMD 106 also may support a wide variety of network applications such as web browsing, email, telephony, streaming multimedia and other traffic that is sent in packets.

TMD 106 may receive a request from client device 102. TMD 106 may select a server from servers 108-110 to forward the request. TMD 106 may employ any of a variety of criteria and mechanisms to select the server, including those mentioned above, load balancing mechanisms, or the like. TMD 106 is further configured to receive a response to the request and to forward the response to client device 102.

TMD 106 may also be configured to examine the request from client device 102 and enforce an orderly page flow through a website that may be hosted on at least one of servers 108-110. For example, TMD 106 may examine a referrer with the request to determine where client device 102 was last at, with respect to websites, and/or webpages. TMD may also examine a cookie from client device 102. If it is determined that client device 102 is attempting to request a webpage that is counter to a predetermined orderly flow through the webpages on the hosted website, TMD 106 may redirect the request to another webpage, such as a HOME page, INDEX page, or other pre-selected webpage. If TMD 106 determines the request is employing an orderly webpage flow, TMD 106 may provide client device 102 another cookie that is based, in part, on the request. TMD 106 may then employ the cookie, and the referrer with a subsequent request to maintain the orderly page flow browsing by client device 102. TMD 106 may employ a process such as described below in conjunction with FIG. 4 to perform at least some of its actions.

TMD 106 may be implemented using one or more personal computers, servers, multiprocessor systems, microprocessor-based or programmable consumer electronics, network PCs, radio frequency (RF) devices, infrared (IR) devices, integrated devices combining one or more of the preceding devices, and the like. Such devices may be implemented solely in hardware or in hardware and software. For example, such devices may include some application specific integrated circuits (ASICs) coupled to one or more microprocessors. The ASICs may be used to provide a high-speed switch fabric while the microprocessors may perform higher layer processing of packets. An embodiment of a network device that could be used as TMD 106 is network device 200 of FIG. 2, configured with appropriate software. The BIG-IP® family of traffic managers, by F5 Networks of Seattle, Wash., are examples of TMDs.

Servers 108-110 may include any computing device capable of communicating packets with client computer 102. Each packet may convey a piece of information. A packet may be sent for handshaking, i.e., to establish a connection or to acknowledge receipt of data. The packet may include information such as a request, a response, or the like. Generally, packets received by servers 108-110 will be formatted according to TCP/IP, but they could also be formatted using another transport protocol, such as User Datagram Protocol (UDP), Internet Control Message Protocol (ICMP), NETbeui, IPX/SPX, token ring, and the like. Moreover, the packets may be communicated between servers 108-110, TMD 106, and client device 102 employing HTTP, HTTPS, and the like.

In one embodiment, servers 108-110 are configured to operate as a website server. However, servers 108-110 are not limited to web servers, and may also operate a messaging server, a File Transfer Protocol (FTP) server, a database server, content server, and the like. Additionally, each of servers 108-110 may be configured to perform a different operation. Thus, for example, server 108 may be configured as a messaging server, while server 109 is configured as a database server. Moreover, while servers 108-110 may operate as other than a website, they may still be enabled to receive an HTTP communication.

Devices that may operate as servers 108-110 include personal computers desktop computers, multiprocessor systems, microprocessor-based or programmable consumer electronics, network PCs, servers, and the like.

Although the above configuration illustrates orderly page browsing being performed within TMD 106, the invention is not so limited. Thus, in one embodiment, the orderly page browsing may also be performed with at least one of servers 108-110, and/or a server and TMD 106, without departing from the scope or spirit of the invention.

Illustrative TMD Environment

Figure 2:
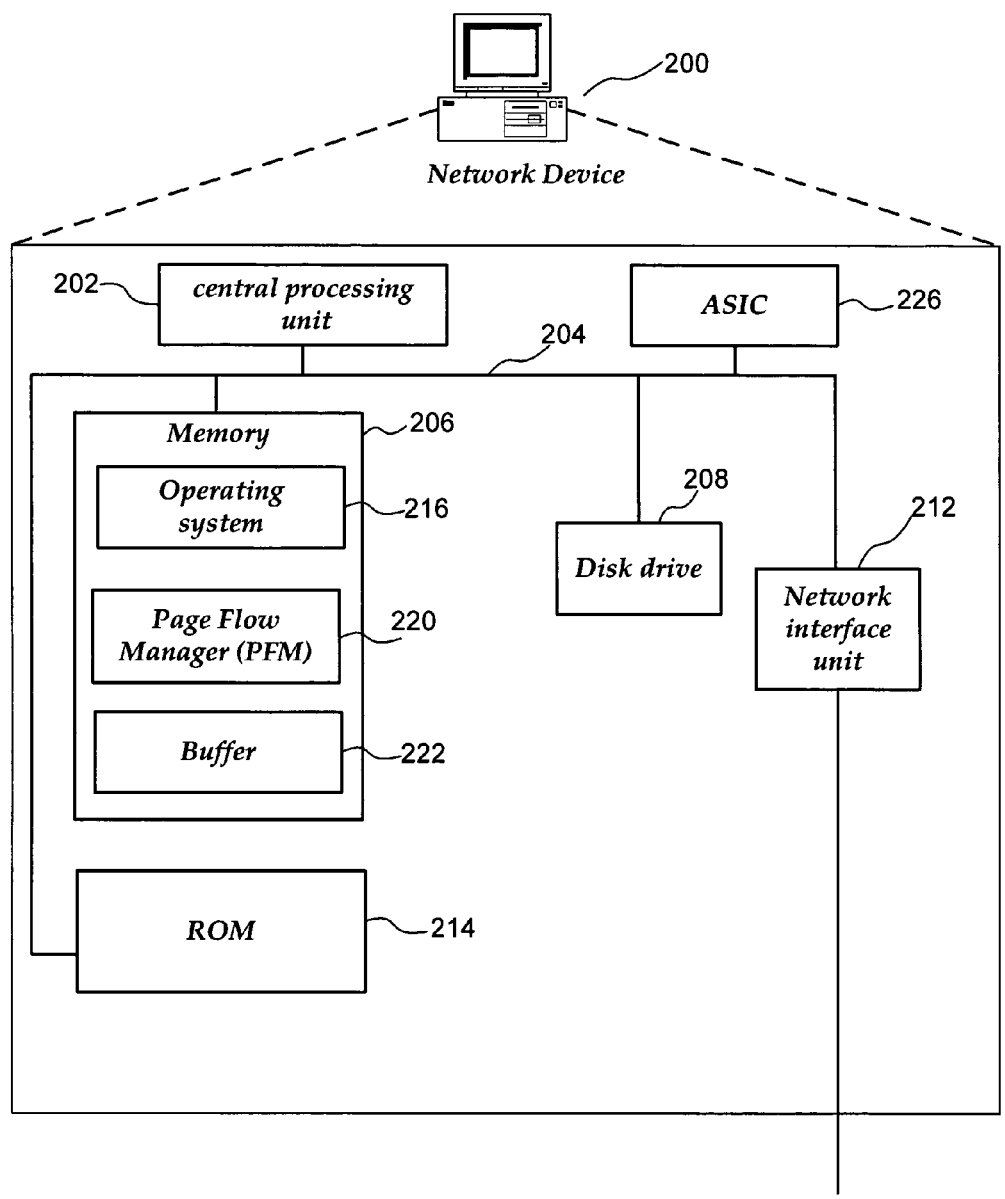
FIG. 2 shows one embodiment of a network device that may be included in a system implementing the invention.

FIG. 2 shows an exemplary network device 200 that may operate as TMD 106 of FIG. 1. It will be appreciated that not all components of network device 200 are illustrated, and that network device 200 may include more or less components than those shown in FIG. 2.

As illustrated in FIG. 2, network device 200 includes a central processing unit (CPU) 202, mass memory, and a network interface unit 212 connected via a bus 204. Network interface unit 212 includes the necessary circuitry for connecting network device 200 to various networks, including network 105 of FIG. 1, and is constructed for use with various communication protocols including the TCP/IP and UDP/IP protocol. Network interface unit 212 may include or interface with circuitry and components for transmitting messages and data over a wired and/or wireless communications medium. Network interface unit 212 is sometimes referred to as a transceiver, Network Interface Card (NIC), or the like.

The mass memory generally includes random access memory ("RAM") 206, read-only memory ("ROM") 214, and one or more permanent mass storage devices, such as hard disk drive 208. The mass memory stores operating system 216 for controlling the operation of network device 200. The operating system 216 may comprise an operating system such as UNIX, LINUX™, or Windows™. In one embodiment, the mass memory may store program code and data for implementing page flow manager (PFM) 220.

PFM 220 is directed towards enforcing an orderly page flow browsing of a website. That is, where a website is created with at least a partial structural hierarchy of directories and webpages, PFM 220 tries to enforce browsing of the website according to the structural hierarchy. For example, consider a website with a domain address www.structure.com, with a home page identified as www.structure.com/home.html. The home page may also provide web links to various directories 'below' the home page. The home page may also provide links to documents, files, graphics, video files, audio files, or the like.

Figure 3:
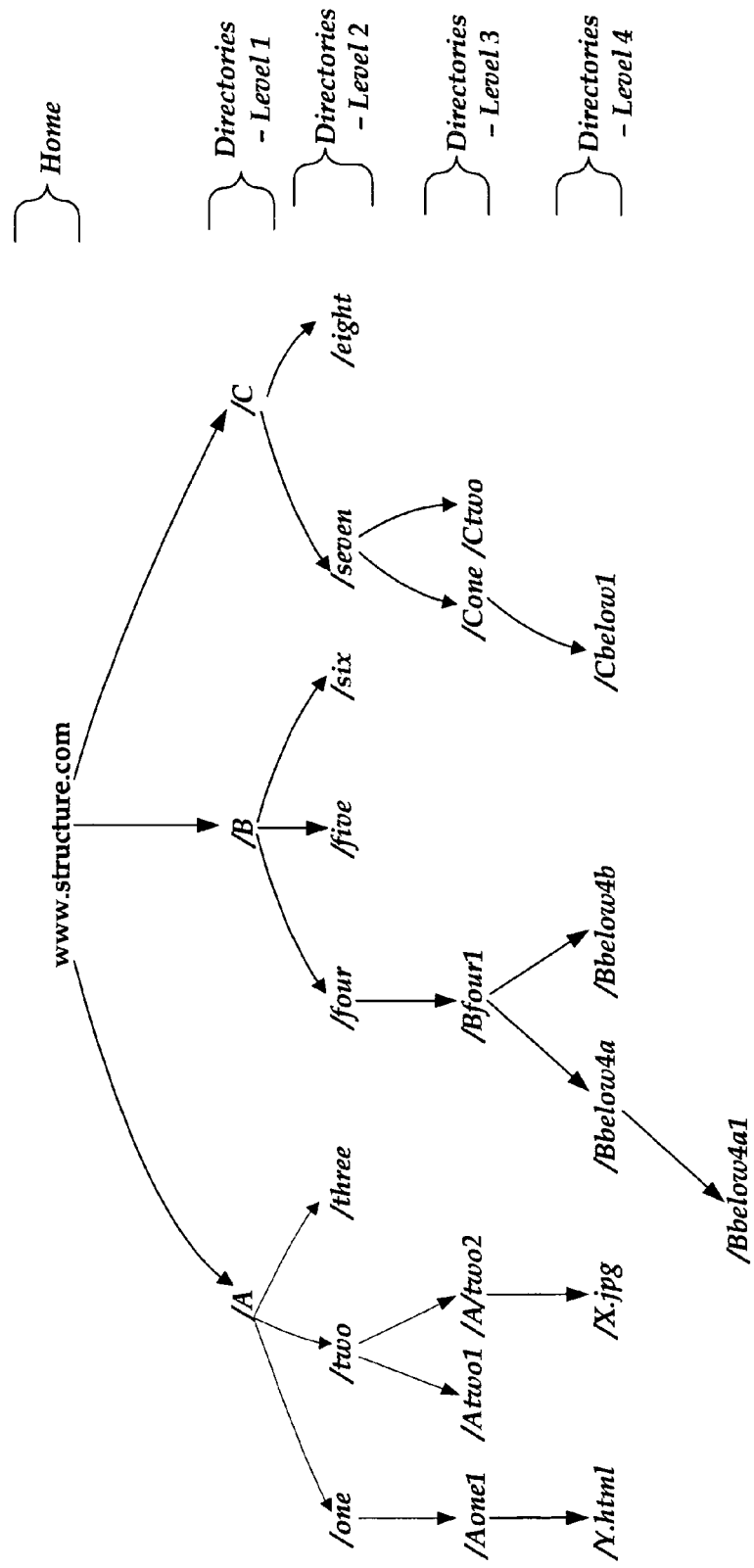
FIG. 3 shows an example of one embodiment of a website employing a structured hierarchy of directories.

An example of one embodiment of a hierarchical website is illustrated on FIG. 3. It is noted that webpages 300 provides a very simplified example, and is not intended to describe all possible variations of hierarchical webpage relationships.

As shown in FIG. 3, however, webpages 300 may start at a home page, sometimes accessed through a domain name. The home page may be named any of a variety of names, including home.html, index.html, or the like. The home page may include a variety of links to other webpages, documents, or the like. As illustrated, the example home page includes links to directories, /A, /B, and /C. These directories may be accessible through webpages, such as A.html, B.html, C.html, or the like. Further, these directories may include subdirectories of various levels. For example, as shown in the figure, /A includes several subdirectories illustrated by /one and /Aone1. As shown, /Aone1 may include a link to a terminating webpage that may include no links to additional subdirectories. This may be illustrated by the terminating webpage /Y.html. Similarly, subdirectory /A/two2 may include a subdirectory that includes a terminating document such as a graphical file, video file, or the like. Such terminating documents may sometimes be called leaf nodes. "Non-terminating" links, sometimes called nodes, may include HTML webpages, Cascading Style Sheets (CSS) webpages, Java Server Pages (JSP) webpages, or the like, even though such webpages may not include additional links.

A common approach to accessing webpages may include enumerating each directory and subdirectory down to the webpage, document, file, or the like. For example, accessing /Y.html may be accomplished by entering into one's browser the following:

HTTP://www.structure.com/A/one/Aone1/Y.html
However, for simplicity, this specification will refer to the above as /Y.html. The preceding protocol (HTTP:), domain name (www.structure.com), and directories (/A, /one, and /Aone1) may be implied.

Returning now to PFM 220, PFM 220 may be configured to enforce browsing through such hierarchically structured websites according to the structured hierarchy. Thus, for example, a user may be permitted to traverse the website by following links such as: /A to /A/one to /A/one1 to /Y.html. But, the user may be restricted from entering the website directly at /Y.html from another website, or jumping from /Y.html (after having properly traversed the structured hierarchy) to another directory, such as to /Cone, /Cbelow1, or the like.

PFM 220 may be directed to enforcing such hierarchical browsing by employing various mechanisms. For example, PFM 220 may monitor a referrer associated with a client request. If the client is attempting to reach into structured hierarchy improperly, PFM 220 may redirect the client's request to a pre-selected webpage at the website.

As the client progresses through the website, PFM 220 may provide a cookie as part of the response to the client's request. PFM 220 may generate the cookie based, in part, on the webpage the client is currently requesting and a secret. In one embodiment, the secret is a rotating secret, such as a random number, hash, or the like. In one embodiment, the cookie also includes information associated with the client. For example, the cookie may include a network address associated with the client, such as an IP network address, or the like. In another embodiment, the cookie may further include another cookie. In one embodiment, PFM 220 may combine information about the requested webpage, the secret, and possibly other components into a value that may then be encrypted. The combining action May be performed using any of a variety of approaches, including summing, concatenating, or the like. PFM 220 may employ any of a variety of cryptographic mechanisms to authenticate the value for the cookie, including, Advanced Encryption Standard (AES), Carter-Wegman Counter (CWC) mode with AES (CWC-AES), Galois Counter Mode with AES (GCM-AES), MD5, Secure Hash Algorithm (SHA), RC6, International Data Encryption Algorithm (IDEA), Data Encryption Standard (DES), Triple DES, RC2, RCS, Blowfish, or so forth. The intent of employing such mechanisms, or others, is to protect the cookie from improper modifications or subversion to circumvent ordered page flow browsing. Thus, any of a variety of other mechanisms may also be employed that is directed to minimizing such actions, without departing from the scope or spirit of the invention.

When the client returns with another request, PFM 220 may employ a referrer, the secret, and possibly the client information to determine if they match the encrypted cookie or if HMAC or one-way hashes are used, this construct is re-created to attempt to reproduce a matching output. In one embodiment, these elements are combined and transformed using the same cryptographic mechanism as used for the cookie. If the results match the cookie it may be determined that the client is attempting to traverse the structured hierarchy in a proper order along an intended path.

In one embodiment, PFM 220 may enable some flexibility in whether the client must traverse the structured in a precise order or not. Thus, for example, PFM 220 may enable the client to traverse in an orderly manner to /Bbelow4a1, and then jump around between subdirectories, below/four of FIG. 3, without having to re-traverse the links. Thus, PFM 220 may, in one embodiment, be configured to examine the referrer to a pre-selected number of subdirectories deep, and enable browsing across directories below that, without having to traverse each of them according to the structured hierarchy. PFM 220 may employ a process such as process 400 described below in conjunction with FIG. 4.

In one embodiment, network device 200 includes one or more Application Specific Integrated Circuit (ASIC) chip 226 connected to bus 204. As shown in FIG. 2, network interface unit 212 may connect to 204 bus through at least one ASIC chip. ASIC chip 226 can include logic that enables at least some of the actions of network device 200. For example, in one embodiment, ASIC chip 226 can be employed to perform packet processing functions on incoming and/or outgoing packets. In one embodiment, ASIC chip 226 performs logic for network monitor 220 and/or redirect coordinator 224. In one embodiment, network device 200 includes one or more field-programmable gate arrays (FPGA) (not shown), instead of, or in addition to, ASIC chip 226. A number of actions for the network device can be performed by ASIC chip 226, an FPGA, CPU 202 with instructions stored in memory, or any combination of actions performed by the ASIC chip, FPGA, and CPU.

Computer storage media may include volatile and nonvolatile, removable and non-removable media implemented in any method or technology for storage of information, such as computer readable instructions, data structures, program modules or other data. Examples of computer storage media include RAM 206, ROM 214, EEPROM, flash memory and/or any other memory architecture, CD-ROM, digital versatile disks (DVD) and/or any other optical storage, magnetic cassettes, magnetic tape, magnetic disk storage and/or any other magnetic storage devices, and/or any other medium that can store information that can be accessed by a computing device.

Network device 200 may also include an input/output interface (not shown) for communicating with external devices or users.

Network device 200 can also be implemented as one or more "blades" where the term "blade" refers to one of multiple electronic circuit boards or cards that are installed in a hardware chassis with a backplane. An exemplary blade may include one or more processors, volatile and non-volatile memory, interfaces suitable for communicating information to and from the blade, and other components for enabling the operation of one or more applications. A blade may also include a specialized interface for the backplane and other interfaces, such as a USB port, FIREWIRE port, serial port, RF interface, IR interface, Ethernet interface, IDE controller, and the like. An application running on a blade may employ any of these interfaces to communicate information to other applications running on other blades and/or devices coupled to the blade server. Network device 200 can also be implemented as a combination of blades and additional components in the chassis.

Generalized Operation

Figure 4:
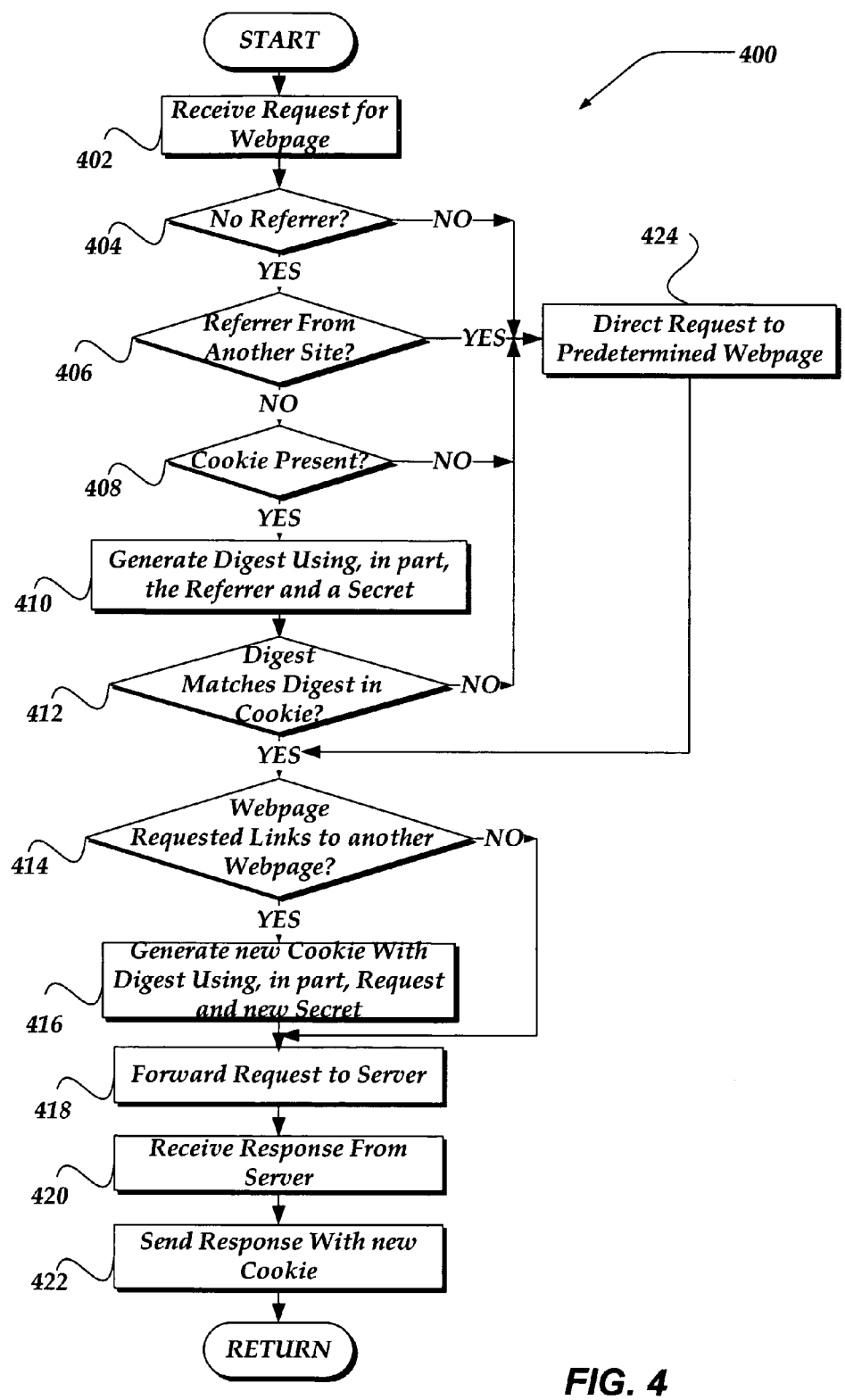
FIG. 4 illustrates a logical flow diagram generally showing one embodiment of a process for enabling an ordered page flow browsing, in accordance with the present invention.

The operation of certain aspects of the invention will now be described with respect to FIG. 4. FIG. 4 illustrates a logical flow diagram generally showing one embodiment of a process for enabling an ordered page flow browsing, in accordance with the present invention. As such, process 400 of FIG. 4 may be implemented within TMD 106 of FIG. 1, for example.

Process 400 begins, after a start block, at block 402 where a request is received for a webpage within the website. The request may come from a client that has previously been browsing another website, a location within the present website, or just started browsing websites on a network. Processing then flows to decision block 404 where a determination is made whether a referrer is associated with the request. Because referrers may be optional, a referrer might not be included with the request. Thus, if a referrer is absent or null, processing branches to block 424; otherwise, processing proceeds to decision block 406.

At decision block 406, a determination is made whether the referrer header includes an identifier, such as a URI, that indicates the requestor last visited another website than the present website. If it is determined that the requestor has last visited another website, processing flows to block 424; otherwise, processing continues to decision block 408.

At decision block 408, a determination is made whether a cookie is provided with the request. If a cookie is provided, processing flows to block 410; otherwise, processing branches to block 424.

At block 410, a digest may be generated that is based, at least in part, on the referrer, and a secret. In one embodiment, the secret is a rotating secret. The secret may be determined based on virtually any criterion, and/or mechanisms, including a random number which may optionally be seeded by a user-defined pass-phrase, a set of random numbers that are rotated through, a pre-determined value, or the like. In addition, a portion of the referrer may be used, rather than the entire referrer. This may be performed to enable flexibility of browsing within the website. Moreover, the digest may also include other elements including information associated with the client making the request, another cookie, or the like. The digest may be generated by combining at least some of these elements. The digest may then be encrypted or hashed using virtually any encryption or hashing mechanism, including those described above.

Although not illustrated in FIG. 4, in one embodiment a determination is made as to whether the cookie is one that was generated by the page currently being requested. This situation may occur when a browser refreshes a page, such as occurs when a user selects a browser "refresh" button. When the cookie was generated by the currently requested page, the request is allowable, and processing may continue to decision block 414. One way to perform this determination is to generate a digest as discussed above regarding block 410, but to use the currently requested URI rather than the referrer, and then perform the matching determination of block 412. However, the invention is not constrained to this mechanism for managing refreshes, and other approaches may be employed without departing from the scope or spirit of the invention. For example, where a refresh has resulted in no referrer being indicated, the request may be redirected to a pre-selected webpage, such as described below in conjunction with block 424. Processing flows next to decision block 412 where a determination is made whether the digest generated at block 410 matches the cookie. If they do, processing flows to decision block 414; otherwise, processing branches to block 424.

At block 424 the request may be redirected to a pre-selected webpage within the website. For example, the request may be redirected to a home page, an index page, a forms page, or the like. Such actions are directed at enforcing structured browsing. However, other actions may also be performed. For example, the request may also be redirected to another website, an error message, or the like, without departing from the scope or intent of the invention. Moreover, if the request is already to the pre-selected webpage within the website, then such actions may be redundant; in which instance, no additional action may be performed. In any event, the process may then flow to decision block 414.

At decision block 414, a determination is made whether the requested webpage includes links to other webpages. That is, is the requested webpage a leaf or node within the website? If the requested webpage is a leaf, a cookie might not be generated and process 400 branches to block 418; otherwise processing branches to block 416.

At block 416, a new cookie may be generated. The new cookie may be generated based on a variety of elements as described above. For example, the cookie may include at least a portion of the requested URI, a secret, information about the client, or the like. Moreover, the new cookie may be encrypted or hashed using virtually any mechanism, including those described above. Processing then flows to block 418.

At block 418, the request may be forwarded to a server. The server may be selected based, in part, on the request type, a load balancing mechanism, to maintain 'stickiness' between the client and a server, or the like. Processing next flows to block 420, where a response to the request is received. Flowing next to block 422, the response, and the cookie may be forwarded to the client making the request. In one embodiment, the forwarded cookie is the new cookie. Where the new cookie is not generated, the cookie may be the previous cookie. In one embodiment, if a new cookie is not generated, the response is sent without a referrer. Processing then returns to a calling process to perform other actions.

Although not illustrated in FIG. 4, in one embodiment, a request that results in a redirect message may be received, that directs the client to send a new request. When this request is received, the process may generate a cookie using the originally requested URI, and send it to the client, as described above, so that when the second request is received, the referrer matches the cookie.

In one embodiment, after receiving the response from the server at block 420, the data generated as described above for block 416 may be used to modify each internal web site link in the HTML response. For example, the information may be appended to the URI for each link. In this embodiment, rather than test a cookie of an incoming request, the URI of the request is tested as described. Thus, both the cookie and the URI techniques can be combined.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A network device for managing web page flow over a network, comprising:
 a transceiver for receiving and sending packets; and
 a processor that is programmed to perform actions comprising:
  receiving from a client a request for a webpage at a website, wherein the website is configured as a hierarchically structured website and wherein the webpage is associated with a first sub-directory or first leaf node within the website;
  providing to the client a cookie with a response to the request;
  receiving from the client a second request for another webpage within the same website, the second request including the cookie and additional information, the additional information including a referrer that identifies the previously requested webpage; and
  in response to determining that the cookie or the additional information identifying the previously requested webpage indicate that the second client request to the other webpage within the same website violates browsing of the same website according to the hierarchical structure of the website, redirecting the client to a pre-determined webpage other than the requested other webpage to maintain orderly browsing of the website, wherein violation of browsing of the hierarchical structure is based on examining the cookie and additional information to determine that the second client request is an improper access, such that the second client request is determined to be an improper access where: 1) the second client request is a request within the hierarchical structure of the same website where the second client request would result in a transition without using a structured flow through the hierarchical structure according to the hierarchical structure of the same website, and is also determined to be an improper access where: 2) the second client request is a request to a second sub-directory within the hierarchical structure of the second leaf node within the hierarchical structure of the same website where the second client request would result in a transition without using a structured flow through the hierarchical structure according to the hierarchical structure of the same website; and
  in response to determining that the cookie and the additional information identifying the previously requested webpage indicate that the second client request to the other webpage is consistent with orderly browsing of the hierarchical structure of the same website, enabling the client to access the other webpage.

2. The network device of claim 1, wherein the cookie further comprises at least one of at least a portion of the request for the webpage, a secret, or information about the client.

3. The network device of claim 1, wherein the cookie is encrypted or hashed.

4. The network device of claim 1, wherein the cookie identifies the webpage.

5. The network device of claim 1, wherein determining orderly browsing of the hierarchical structure of the website is further based on whether the cookie and the additional information identify the same webpage.

6. The network device of claim 1, wherein the webpage and the other webpage are the same webpage.

7. The network device of claim 1, wherein in response to determining that the cookie or the additional information identifying the previously requested webpage indicate that the second client request to the other webpage violates browsing of the website based on the hierarchical structure of the website further comprises:

in response to determining that at least a portion of the additional information is, at least in part, different from the cookie, redirecting the second request to the predetermined webpage other than the requested other webpage.

8. The network device of claim 1, wherein at least a portion of the additional information further comprises at least a portion of a Universal Resource Identifier (URI).

9. The network device of claim 1, wherein providing the cookie further comprises:

in response to determining that the requested webpage is a leaf webpage, providing a cookie that is associated with a request for a non-leaf webpage.

10. The network device of claim 1, wherein in response to determining that the cookie and the additional information identifying the previously requested webpage indicate that the second client request to the other webpage is consistent with orderly browsing further comprises being based on whether the additional information identifying the previously requested webpage matches at least a portion of the cookie.

11. The network device of claim 1, wherein a response to the request comprises a redirect message directing the client to send the other request.

12. A method of managing web page flow over a network, comprising:

receiving from a client a request over a network for a webpage at a website, the website being configured as a hierarchically structured website, wherein the request includes a cookie and wherein the webpage is associated with a first sub-directory or first leaf node within the website;

extracting information from the request about where the client was last browsing;

determining a digest by, in part, combining at least a portion of the extracted information with at least a secret; and in response to determining that the digest matches the cookie, enabling the client to access the webpage for display at a client device, such that the client is restricted to browsing the website according to the hierarchical structure of the website, and wherein the client is inhibited from violating browsing of the same website according to the hierarchical structure at least by comparing the digest with the cookie to determine whether the client is attempting an improper access, such that an access is improper where 1) the client is attempting to access a second subdirectory within the hierarchical structure where the access is without following a structured path of directories to the requested second sub-directory according to the hierarchical structure of the website, and such that 2) the access is also improper where the client is attempting to access a second leaf node within the hierarchical structure where the access is without following a structured path of directories to the requested second leaf node according to the hierarchical structure of the website.

13. The method of claim 12, wherein the cookie is encrypted or otherwise cryptographically obscured and protected against inspection or tampering.

14. The method of claim 12, wherein the webpage and the extracted information about where the client was last browsing indicate a same webpage.

15. The method of claim 12, wherein determining the digest further comprises combining at least the portion of information, the secret, and at least one of another cookie, or a network address associated with the client.

16. The method of claim 12, wherein extracting information from the request further comprises extracting an HTTP referrer.

17. The method of claim 12, further comprising:

in response to determining that the digest is different from the cookie, redirecting the request to a preselected webpage within the hierarchical structure of the website to enforce a structured and orderly browsing of web pages within the website by the client.

18. The method of claim 12, wherein the extracted information further comprises at least a portion of a Universal Resource Identifier (URI).

19. The method of claim 12, wherein restricting the client to orderly browsing through the website according to the hierarchical structure of the website further comprises enabling access to the requested webpage if the webpage and a webpage that the client was last browsing are within a pre-defined set of subdirectories within the hierarchical structure of the website.

20. A computer-readable storage medium for storing program instructions for performing the method of claim 12 by a network device.

21. A traffic management device for managing an orderly website browsing, comprising:

a transceiver for receiving and sending packets;

program code that receives from a client a request for a webpage at a website, wherein the request is associated with a cookie and wherein the webpage is associated with a first sub-directory or a first leaf node within the website; and means for selectively allowing the client to receive the requested webpage based on examining the cookie and additional information identifying a previously requested webpage by the client such that the client is restricted to orderly browsing through the website according to a hierarchical structure of the website such that the client is restricted from improper access, such that an access is improper where 1) the client is attempting to access a second sub-directory within the hierarchical structure wherein the access is without following a structured path of directories to the requested second sub-directory within the same website according to the hierarchical structure of the website, and the access is also improper where 2) the client is attempting to access a second leaf node within the hierarchical structure wherein the access is without following a structured path of directories to the second leaf node within the same website according to the hierarchical structure of the website.

22. The traffic management device of claim 21, wherein the cookie identifies the previously requested webpage.

23. The traffic management device of claim 21, wherein the means for selectively allowing the client comprises program code that generates a cookie associated with the previously requested webpage, and compares the cookie with an HTTP referrer within the additional information that identifies the previously requested webpage.

* * * * *